(12) United States Patent
Holaday et al.

(10) Patent No.: US 11,504,930 B2
(45) Date of Patent: Nov. 22, 2022

(54) COMPACTION SYSTEM AND METHODS FOR COMPACTING COMPOSITE COMPONENTS

(71) Applicant: General Electric Company, Schenectady, NY (US)

(72) Inventors: Thomas Samuel Holaday, Park Hills, KY (US); Joel Primmer White, Cincinnati, OH (US); Gregory Scott Phelps, Cincinnati, OH (US); Darrell Glenn Senile, Oxford, OH (US); Tyler Lucas Walker, Newark, DE (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/166,223

(22) Filed: Feb. 3, 2021

(65) Prior Publication Data

US 2022/0242079 A1    Aug. 4, 2022

(51) Int. Cl.
| | | |
|---|---|---|
| *B29C 65/00* | (2006.01) |
| *B29C 70/54* | (2006.01) |
| *B29C 70/02* | (2006.01) |
| *B29C 65/78* | (2006.01) |
| *B30B 11/04* | (2006.01) |
| *B32B 3/08* | (2006.01) |
| *B29D 99/00* | (2010.01) |
| *B30B 11/02* | (2006.01) |

(52) U.S. Cl.
CPC ........ *B30B 11/027* (2013.01); *B29C 65/7802* (2013.01); *B29C 66/301* (2013.01); *B29C 66/304* (2013.01); *B29C 70/023* (2013.01); *B29C 70/541* (2013.01); *B30B 11/04* (2013.01); *B29D 99/0003* (2013.01); *B32B 3/08* (2013.01)

(58) Field of Classification Search
CPC ....... B30B 11/02; B30B 11/027; B30B 11/04; B29D 99/0005; B29D 99/0014
See application file for complete search history.

(56) References Cited

U.S. PATENT DOCUMENTS

| | | |
|---|---|---|
| 1,554,497 A | 9/1925 | Goff |
| 2,057,466 A | 10/1936 | Willetts |
| 2,139,542 A | 12/1938 | Finlayson et al. |
| 3,190,216 A | 6/1965 | Keller |
| 3,438,836 A | 4/1969 | Farnam |
| 7,186,367 B2 | 3/2007 | Hou et al. |
| 8,307,872 B2 | 11/2012 | Kendall et al. |
| 8,940,119 B2 | 1/2015 | Hanawa et al. |
| 8,997,642 B2 | 4/2015 | Stewart et al. |
| 10,744,722 B2 | 8/2020 | Rossi et al. |

(Continued)

*Primary Examiner* — Mary Lynn F Theisen
(74) *Attorney, Agent, or Firm* — Dority & Manning, P.A.

(57) ABSTRACT

Compaction systems and methods of compacting components are provided. In one aspect, a laminate of a component can be laid up on a tool of a compaction system. The laminate defines a cavity. A noodle is positioned relative to or in the cavity. A noodle ring is then positioned relative to the noodle. For instance, the noodle ring can be placed over the noodle. A cross section of the noodle ring can be shaped complementary to a cross section of the noodle. A plunger of the compaction system is moved so that it engages the noodle ring. Particularly, the plunger is moved in such a way that a force is applied on the noodle ring so that the noodle ring compacts the noodle into the cavity.

20 Claims, 11 Drawing Sheets

(56) References Cited

U.S. PATENT DOCUMENTS

2008/0210372 A1    9/2008  Cumings et al.
2017/0029577 A1*   2/2017  Glynn ................... B29C 70/081
2019/0224938 A1*   7/2019  Feie ........................ B29C 70/54

* cited by examiner

COMPACTION SYSTEM AND METHODS FOR COMPACTING COMPOSITE COMPONENTS

FIELD

The present subject matter relates generally to compaction systems and methods of compacting composite components, such as composite components for gas turbine engines.

BACKGROUND

Some gas turbine engines can include a number of different types of composite components, such as Ceramic Matrix Composite (CMC) components and Polymer Matrix Composite (PMC) components. In the process of manufacturing such composite components, and composite components generally, there is often a need to compact the components. Conventional manufacturing methods, such as a vacuum/positive pressure debulk methods and press methods, have been effective for compacting composite components. However, conventional methods usually require complex equipment and tool moving solutions. Additionally, they can be cumbersome and imprecise in the way they apply pressure to the component.

Accordingly, improved compaction systems and methods of compacting composite components that address one or more of the challenges noted above would be useful.

BRIEF DESCRIPTION

Aspects and advantages of the invention will be set forth in part in the following description, or may be obvious from the description, or may be learned through practice of the invention.

In one aspect, a method is provided. The method includes positioning a laminate formed of plies on a tool of a compaction system. The laminate defines a cavity. The method also includes positioning a noodle relative to or in the cavity. Further, the method includes positioning a noodle ring relative to the noodle. In addition, the method includes moving a plunger to apply a force on the noodle ring so that the noodle ring compacts the noodle into the cavity.

In another aspect, a method is provided. The method includes positioning a laminate on a tool of a compaction system. The laminate has a first section and a second section each formed of one or more plies. Further, the laminate defines a cavity at a location where the first section and the second section diverge. The method also includes positioning at least a portion of a noodle in the cavity. Further, the method includes positioning a noodle ring relative to the noodle, the noodle ring having a cross section shaped complementary to a cross section of the noodle. In addition, the method includes moving a plunger to apply a force on the noodle ring so that the noodle ring compacts the noodle into the cavity.

In yet another aspect, a method is provided. The method includes positioning a laminate on a tool of a compaction system, the laminate defining a cavity. In addition, the method includes positioning at least a portion of a noodle in the cavity and positioning a noodle ring relative to the noodle. Further, the method includes coupling the noodle ring to the tool. The method also includes applying a force on the noodle ring so that the noodle is compacted into the cavity.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
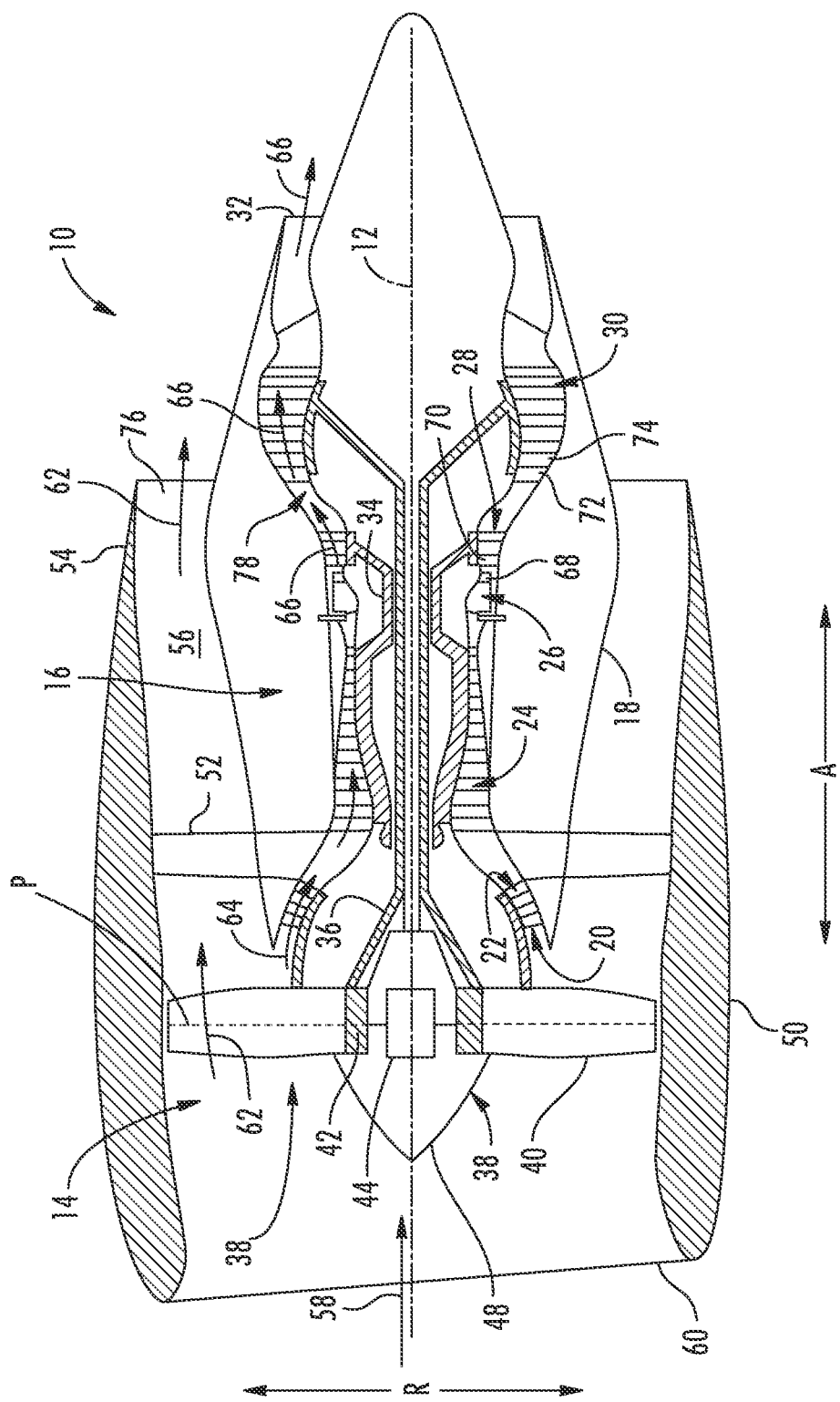
FIG. 1 provides a schematic cross-sectional view of an exemplary gas turbine engine according to various embodiments of the present subject matter.

Repeat use of reference characters in the present specification and drawings is intended to represent the same or analogous features or elements.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows and "downstream" refers to the direction to which the fluid flows.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. For example, the approximating language may refer to being within a 1, 2, 4, 5, 10, 15, or 20 percent margin in either individual values, range(s) of values, and/or endpoints defining range(s) of values.

Exemplary aspects of the present disclosure are directed to compaction systems and methods of compacting components, such as composite components for gas turbine engines. In one aspect, a method is provided for compacting a laminate. The laminate can form an entire portion of a composite component or a portion thereof. The laminate can be laid up on a tool of a compaction system or can be laid up elsewhere and subsequently positioned on the tool. The laminate is laid up in such a way that the laminate defines a cavity. The cavity can be a space between two diverging sections of the laminate, for example. With the laminate positioned on the tool, a noodle is positioned relative to or in the cavity. Generally, the noodle fills the cavity to improve the mechanical properties of a finished component. In some embodiments, prior to positioning the noodle relative to the cavity, a shaping tool can be moved into the cavity to shape the cavity to a desired shape. This may ensure the cavity is sized to receive the noodle.

With the noodle positioned relative to or in the cavity, a noodle ring is positioned relative to the noodle. For instance, the noodle ring can be placed over the noodle. A cross section of the noodle ring can be shaped complementary to a cross section of the noodle. For instance, if the noodle has a cross section with an airfoil shape, the noodle ring can likewise have a cross section with the same airfoil shape. The noodle ring can have a hollow interior, a look-through window, or can be transparent in whole or in part. In this way, when an operator is positioning the noodle ring relative to the noodle, the operator is able to visibly see the plies of the laminate and can take care not to damage the plies. In some embodiments, optionally, a sheet or film is placed between the noodle and the noodle ring.

With the noodle ring positioned in place, a plunger of the compaction system is moved so that it engages the noodle ring. Particularly, the plunger is moved in such a way that a force is applied on the noodle ring so that the noodle ring compacts the noodle into the cavity. Any suitable mechanical device, mechanism, or system can be used to move the plunger so that the noodle is ultimately compacted into the cavity. In addition to compacting the noodle into the cavity, the laminate or portions thereof can likewise be compacted when the plunger is moved during the compaction process.

The compaction systems and methods provided herein provide a number of advantages and benefits. For instance, the systems and methods provided herein allow for compaction of a component with minimal equipment and tool transportation, offering decreased process time and leaner processes, among other benefits. Further, the systems and methods provided herein provide the ability to apply pressure to specific portions of a laminate only, e.g., compacting a noodle into a cavity of a laminate. This may allow for improved compaction/composite part assembly and increased part yield. In addition, compaction of a composite component using the systems and methods disclosed herein can be more closely controlled than with conventional systems and techniques, such as bagging. For instance, the systems and methods provided herein can compact components with precise load or displacement-controlled compaction.

FIG. 1 provides a schematic cross-sectional view of a gas turbine engine in accordance with one example embodiment of the present subject matter. For the depicted embodiment of FIG. 1, the gas turbine engine is a high-bypass turbofan jet engine 10, referred to herein as "turbofan 10." As shown in FIG. 1, the turbofan 10 defines an axial direction A (extending parallel to a longitudinal centerline 12 provided for reference), a radial direction R, and a circumferential direction extending in a plane orthogonal to the axial direction A three hundred sixty degrees around the longitudinal centerline 12.

The turbofan 10 includes a fan section 14 and a core turbine engine 16 disposed downstream from the fan section 14. The core turbine engine 16 includes a substantially tubular outer casing 18 that defines an annular core inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

The fan section 14 includes a variable pitch fan 38 having a plurality of fan blades 40 coupled to a disk 42 in a spaced apart manner. As depicted, the fan blades 40 extend outward from the disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36.

Referring still to FIG. 1, the disk 42 is covered by a rotatable front nacelle 48 aerodynamically contoured to promote an airflow through the plurality of fan blades 40. Additionally, the fan section 14 includes an annular fan casing or outer nacelle 50 that circumferentially surrounds the fan 38 and/or at least a portion of the core turbine engine 16. The nacelle 50 may be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the annular core inlet 20 and into the LP compressor 22. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It will be appreciated that, although described with respect to turbofan 10 having core turbine engine 16, the present subject matter may be applicable to other types of turbomachinery. For example, the present subject matter may be suitable for use with or in turboprops, turboshafts, turbojets, industrial and marine gas turbine engines, and/or auxiliary power units.

In some embodiments, components of turbofan 10 can be formed of a composite material. For example, components within hot gas path 78, such as components of combustion section 26, HP turbine 28, and/or LP turbine 30, can be formed of a Ceramic Matrix Composite (CMC) material, which is a non-metallic material having high temperature capability. For instance, turbine blades and turbine nozzles can be formed of CMC materials. Other components of turbine engine 10 also may be formed from CMC materials or other suitable composite materials, such as e.g., a Polymer Matrix Composite (PMC) material.

Exemplary matrix materials for such CMC components can include silicon carbide, silicon, silica, alumina, or combinations thereof. Ceramic fibers can be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). CMC materials may have coefficients of thermal expansion in the range of about $1.3 \times 10^{-6}$ in/in/° F. to about $3.5 \times 10^{-6}$ in/in/° F. in a temperature range of approximately 1000-1200° F.

Figure 2:
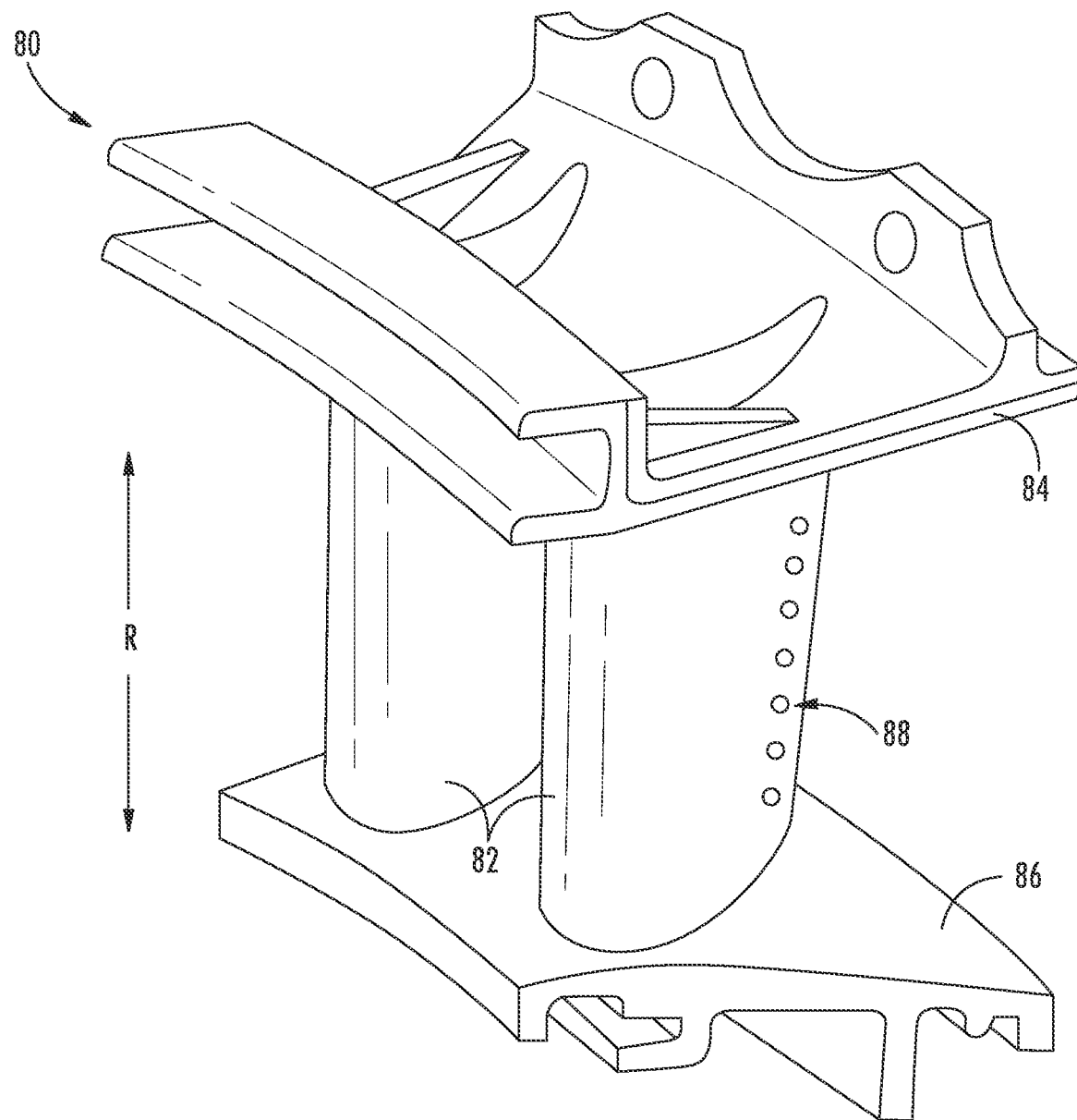
FIG. 2 provides a perspective view of a turbine nozzle segment according to an exemplary embodiment of the present subject matter.

FIG. 2 provides a perspective view of a turbine nozzle segment 80 according to an exemplary embodiment of the present subject matter. For this embodiment, the turbine nozzle segment 80 is formed of a CMC material, such as one or more of the CMC materials noted above. The turbine nozzle segment 80 is one of a number of nozzle segments that when connected together form an annular nozzle assembly of a gas turbine engine, such as e.g., the turbofan 10 of FIG. 1. The nozzle segment 80 includes vanes 82, such as e.g., stator vanes 68 of the turbofan 10 of FIG. 1. Each vane 82 or airfoil extends between an outer and inner band 84, 86. The vanes 82 define a plurality of cooling holes 88. Cooling holes 88 provide film cooling to improve the thermal capability of the vanes 82. The cooling holes 88 can be fluidly connected to one or more fluid passageways that extend internally through the vanes 82. Furthermore, as will be explained more fully below, one or more portions of the turbine nozzle segment 80 can be subjected to a compaction process.

Figure 3:
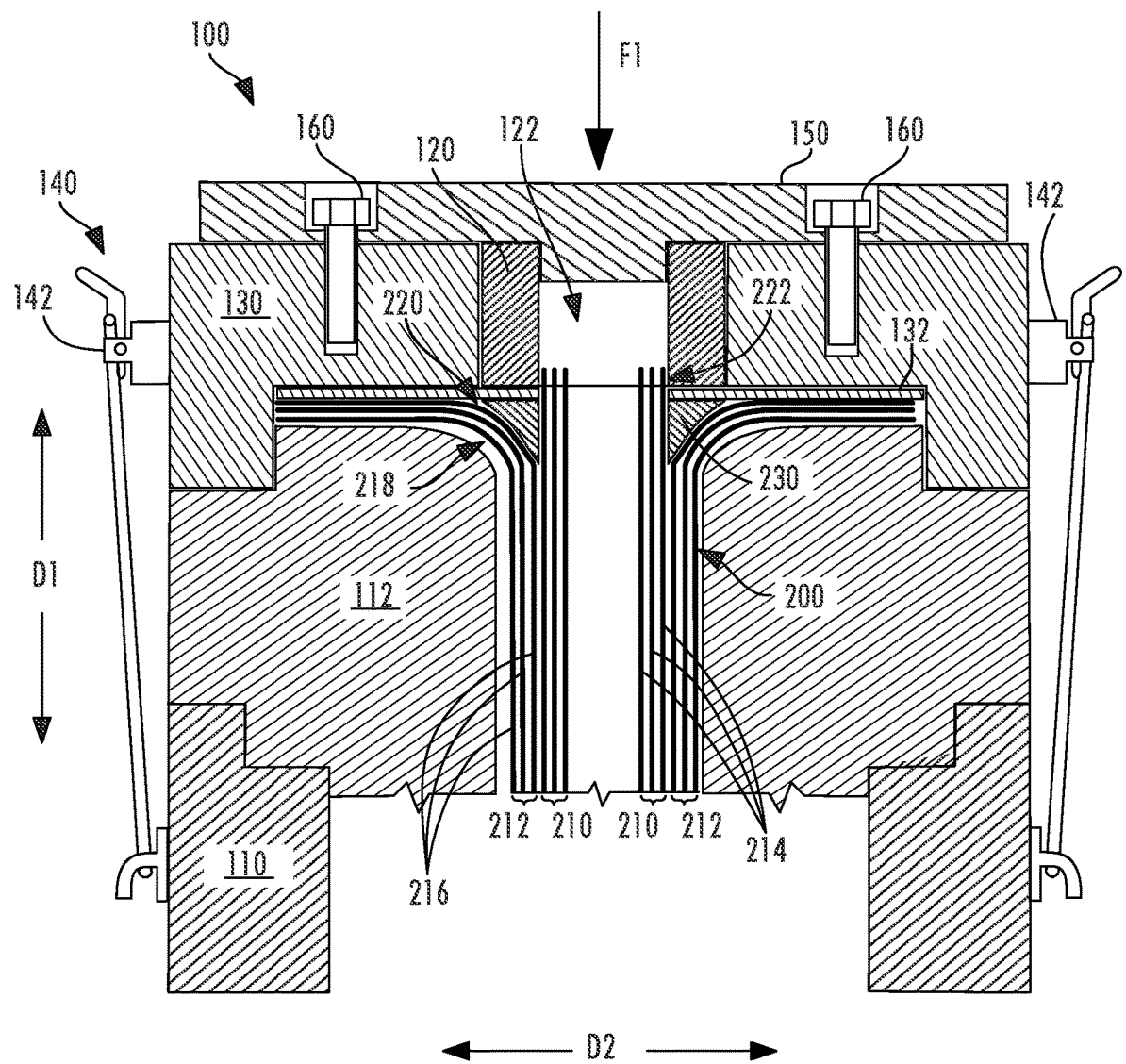
FIG. 3 provides a schematic cross-sectional view of a compaction system in the process of compacting a laminate according to an example embodiment of the present subject matter.

FIG. 3 provides a schematic cross-sectional view of a compaction system 100 in the process of compacting a laminate 200 according to one example embodiment of the present subject matter. The laminate 200 can form a portion of a composite component, such as the turbine nozzle segment 80 of FIG. 2. It will be appreciated that the compaction system 100 can be used to compact laminates of other components as well.

For the depicted embodiment of FIG. 3, the laminate 200 has a first section 210 and a second section 212. The first section 210 includes one or more plies 214 and the second section 212 includes one or more plies 216. Generally, the first section 210 extends lengthwise along a first direction D1, e.g., a radial direction. At least a portion of the second section 212 extends lengthwise along the first direction D1 and at least a portion of the second section 212 extends lengthwise along a second direction D2, e.g., a circumferential direction. Accordingly, the second section 212 of the laminate 200 transitions from extending lengthwise along the first direction D1 to extending lengthwise along the second direction D2. The second direction D2 can be substantially orthogonal to the first direction D1.

The second section 212 transitions from extending lengthwise along the first direction D1 to the second direction D2 at a joint interface 218 of the laminate 200. As one example, the joint interface 218 of the laminate may correspond with the joint interface between one of the vanes 82 and the outer band 84 of the turbine nozzle segment 80 of FIG. 2. For instance, the portion of the second section 212 that extends lengthwise along the second direction D2 may form the outer band 84 or a portion thereof. The first section 210 and the portion of the second section 212 that extends lengthwise along the first direction D1 may form one of the vanes 82 or a portion thereof. As another example, the joint interface 218 of the laminate may correspond with the joint interface between one of the vanes 82 and the inner band 86 of the turbine nozzle segment 80 of FIG. 2.

The laminate 200 defines a cavity 220. For this embodiment, the cavity 220 is defined between the first section 210 and the second section 212 where the second section 212 transitions from extending lengthwise along the first direction D1 to extending lengthwise along the second direction D2, or stated another way, at the joint interface 218. In this regard, the laminate 200 defines the cavity 220 at a location where the first section 210 and the second section 212 diverge. The cavity 220 has a triangular cross section in this example embodiment, but it will be appreciated that the cavity 220 may be defined to have other suitable cross-sectional shapes. A noodle 230 can be positioned in or relative to the cavity 220 and compacted therein by the compaction system 100 as will be described herein. The noodle 230 can be formed of a composite material, such as a CMC material. The noodle 230 can be formed of other suitable materials as well. The noodle 230 can be formed as a single part or can be formed as separate or distinct parts. Generally, the noodle 230 is positioned within the cavity 220 to fill the void, which provides improved mechanical properties to the finished component, among other benefits. In some embodiments, a slurry composition, e.g., a matrix material, can be inserted into the cavity 220 prior to the noodle 230 being compacted into the cavity 220. This may facilitate a more complete filling of the cavity 220, which may lead to improved mechanical properties of the finished component.

As further shown in FIG. 3, the compaction system 100 includes a tool holder 110 that holds or supports a tool 112. The tool 112 is contoured complementary to the shape of the laminate 200 so that the laminate 200 can be properly positioned in place for compaction. As depicted, the laminate 200 can be positioned relative to or placed over the tool 112. When the laminate 200 is positioned in place on the tool 112, a noodle ring 120 is positioned relative to the noodle 230. Particularly, the noodle ring 120 is placed over at least a portion of the noodle 230. The noodle ring 120 can be formed as a single part or can be formed as separate or distinct sections. Thus, in some embodiments, the noodle ring 120 is formed of a single, unitary component. In other embodiments, the noodle ring 120 is formed of at least two sections.

In some embodiments, the noodle ring 120 provides some means for an operator to look through the noodle ring 120. In this way, when an operator is placing the noodle ring 120 in position relative to the noodle 230, the operator can look through the noodle 230 and can visibly see a protruding portion 222 of the first section 210. The protruding portion 222 is the portion of the first section 210 that protrudes above the second section 212 and noodle 230 along the first direction D1 as illustrated in FIG. 3. As shown, when the noodle ring 120 is in place, the protruding portion 222 of the first section 210 of the laminate 200 overlaps with the noodle ring 120 along the first direction D1. With the protruding portion 222 of the first section 210 located, the operator can make sure not to contact the protruding portion 222 with the noodle ring 120 and can position the noodle ring 120 relative to the noodle 230 as shown in FIG. 3. If contacted, the plies 214 forming the protruding portion 222 of the first section 210 can become damaged, e.g., delamination can occur.

In some embodiments, the noodle ring 120 can define a hollow interior 122, e.g., as shown in FIG. 3. The hollow interior 122 allows an operator to look through the noodle ring 120 to ensure the protruding portion 222 of the first section 210 is not contacted when the noodle ring 120 is positioned in place. In other embodiments, the noodle ring 120 or a portion thereof can be formed of a transparent material. For instance, in some embodiments, the noodle ring 120 can include a look-through window. In other embodiments, the entire noodle ring 120 can be formed of a transparent material.

The noodle ring 120 can be shaped complementary to the noodle 230. Particularly, the noodle ring 120 can have a cross section shaped complementary to a cross section of the noodle 230. Stated another way, an outline of the noodle ring 120 can be shaped complementary to an outline of the noodle 230. In this way, when a force is applied to the noodle ring 120 during compaction, the noodle ring 120 can apply a force on the entire noodle 230 during compaction.

Figure 4:
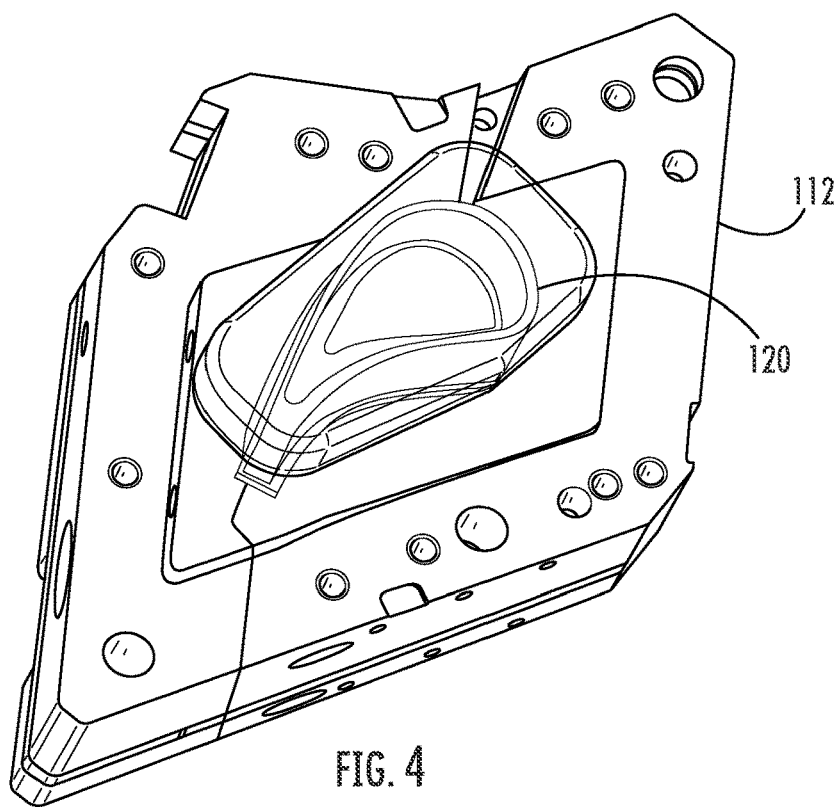
FIG. 4 provides a perspective view of an example noodle ring positioned relative to a noodle according to an example embodiment of the present subject matter.

FIG. 4 provides a perspective view of an example noodle ring 120 positioned relative to a noodle (the noodle is not shown in FIG. 4). In FIG. 4, a plunger of the compaction system 100 is shown transparent for illustrative purposes. As depicted, the noodle ring 120 has a cross section shaped like an airfoil or vane, such as a vane 82 of the turbine nozzle segment 80 of FIG. 2. The cross-sectional shape of the noodle ring 120 can match or be complementary to the cross-sectional shape of the noodle, which is positioned below the noodle ring 120 and not visible in FIG. 4.

Figure 5:
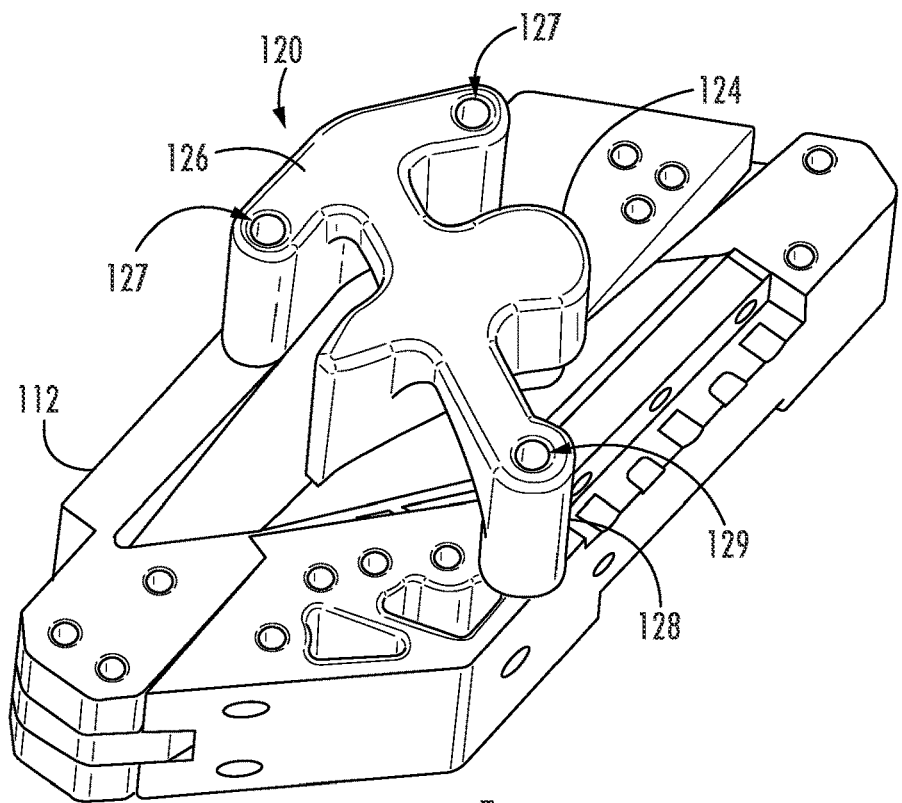
FIG. 5 provides a perspective view of another example noodle ring positioned relative to a noodle according to an example embodiment of the present subject matter.

FIG. 5 provides a perspective view of another example noodle ring 120 positioned relative to a noodle (the noodle is not shown in FIG. 5). For this embodiment, the noodle ring 120 has a main body 124. The main body 124 has a cross section shaped complementary to a cross section of the noodle, which is positioned below the noodle ring 120 and not visible in FIG. 5. Moreover, for this embodiment, the noodle ring 120 has a first stabilizing member 126 extending outward from the main body 124. The first stabilizing member 126 couples the noodle ring 120 to at least one of a band debulk cap (not shown in FIG. 5) and the tool 112. The noodle ring 120 also has a second stabilizing member 128 extending outward from the main body 124. The second stabilizing member 128 couples the noodle ring 120 to at least one of a band debulk cap (not shown in FIG. 5) and the tool 112. The first stabilizing member 126 and the second stabilizing member 128 extend outward from the main body 124 in opposite directions from one another. However, in other embodiments, the first stabilizing member 126 and the second stabilizing member 128 need not extend in opposite directions from one another.

The first stabilizing member 126 defines one or more openings 127 that are sized to receive fasteners, such as threaded bolts. Threaded bolts can extend through the first stabilizing member 126 and into corresponding threaded openings defined by the tool 112, for example. Similarly, the second stabilizing member 128 defines one or more openings 129 that are sized to receive fasteners, such as threaded bolts. Threaded bolts can extend through the second stabilizing member 128 and into corresponding threaded openings defined by the tool 112, for example. Such bolts or other fasteners can be used to secure the noodle ring 120 to the tool 112, which may ensure that the noodle ring 120 remains in place during compaction. In this manner, the noodle ring 120 can be coupled to the tool 112. Using the first and second stabilizing members 126, 128 to secure the main body 124 of the noodle ring 120 on opposing sides thereof can provide enhanced stability to the noodle ring 120 during compaction.

Returning to FIG. 3, with the noodle ring 120 positioned in place relative to the noodle 230, optionally, a band debulk cap 130 can be moved in place to secure the noodle ring 120 in place relative to the noodle 230 as shown in FIG. 3. A latch system 140 can be used to secure the band debulk cap 130 in place. For this embodiment, the latch system 140 includes latch clamps 142 that connect with the tool holder 110. Each latch clamp 142 is movable between a clamped position and an unclamped position. In the clamped position, a given latch clamp 142 secures the band debulk cap 130 in place. In the unclamped position, a given latch clamp 142 does not secure the band debulk cap 130 in place. In addition to securing the noodle ring 120 relative to the noodle 230, the band debulk cap 130 may also secure the laminate 200 in place relative to the tool 112.

Further, optionally, a film or protective sheet 132 can be positioned between the noodle 230 and the noodle ring 120, e.g., along the first direction D1. This may allow for the noodle ring 120 to be removed more easily after compaction and can prevent foreign objects on the noodle ring 120, which may be reusable, from being transferred to the noodle 230. In addition, the protective sheet 132 can extend such that it is positioned between the band debulk cap 130 and the second section 212 of the laminate 200 that extends lengthwise along the second direction D2. The protective sheet 132 can prevent the plies 216 from being damaged by the band debulk cap 130 during compaction. The protective sheet 132 can be formed of any suitable material. As one example, the protective sheet 132 can be formed of a Room-Temperature Vulcanizing (RTV) rubber material.

The compaction system 100 also includes a plunger 150. For this embodiment, the plunger 150 and the band debulk cap 130 can be formed as separate components as shown in FIG. 3. In alternative embodiments, the plunger 150 and the band debulk cap 130 can be formed as a single component. Notably, the plunger 150 is movable, e.g., along the first direction D1. As will be explained in detail herein, the plunger 150 can be moved such that the plunger 150 applies a force F1 on the noodle ring 120 so that the noodle ring 120 in turn compacts the noodle 230 into the cavity 220. Moreover, when the plunger 150 is moved, e.g., downward along the first direction D1 toward the laminate 200, the applied force F1 also compacts the laminate 200 generally. For instance, the plunger 150 can apply a force on the band debulk cap 130 and the band debulk cap 130 can in turn compact the portion of the second section 212 that extends lengthwise along the second direction D2. The plunger 150 can be moved by any suitable mechanism, device, or system. Various examples are provided below.

For the depicted embodiment of FIG. 3, the plunger 150 can be moved along the first direction D1 to compact the laminate 200 by torqueing or tightening one or more fasteners. For instance, as shown, one or more bolts 160 can be tightened or loosened to control the position of the plunger 150 along the first direction D1 (e.g., a vertical direction). For example, to move the plunger 150 toward the laminate 200 along the first direction D1, the bolts 160 can be tightened. Conversely, to move the plunger 150 away from the laminate 200 along the first direction D1, e.g., after compaction, the bolts 160 can be loosened. The bolts 160 can be inserted through holes defined by the plunger 150 and into blind holes defined by the band debulk cap 130. The plunger 150 and/or the band debulk cap 130 can include threading so that threads of the bolts 160 can threadingly engage the plunger 150 and/or the band debulk cap 130. In other embodiments, it will be appreciated that the bolts 160 can engage other structures in addition or alternatively to the plunger 150 and/or the band debulk cap 130. For instance, the bolts 160, or more broadly fasteners, can engage the tool 112 and/or the tool holder 110.

In some embodiments, the compaction system 100 includes a single bolt for controlling the position of the plunger 150 and thus the applied force on the laminate 200. In other embodiments, the compaction system 100 includes multiple bolts for controlling the position of the plunger 150 and thus the applied force on the laminate 200. In such embodiments, the bolts can be strategically positioned so that the applied force F1 is more evenly distributed to the laminate 200 and/or noodle 230. For instance, in some embodiments, bolts can be positioned on opposite sides of the noodle ring 120, e.g., as shown in FIG. 3. It will also be appreciated that different bolts can be tightened to different degrees so that more or less force is applied to a specific portion of the laminate 200. In this way, the force applied on different portions of the laminate 200 can be controlled.

Figure 6:
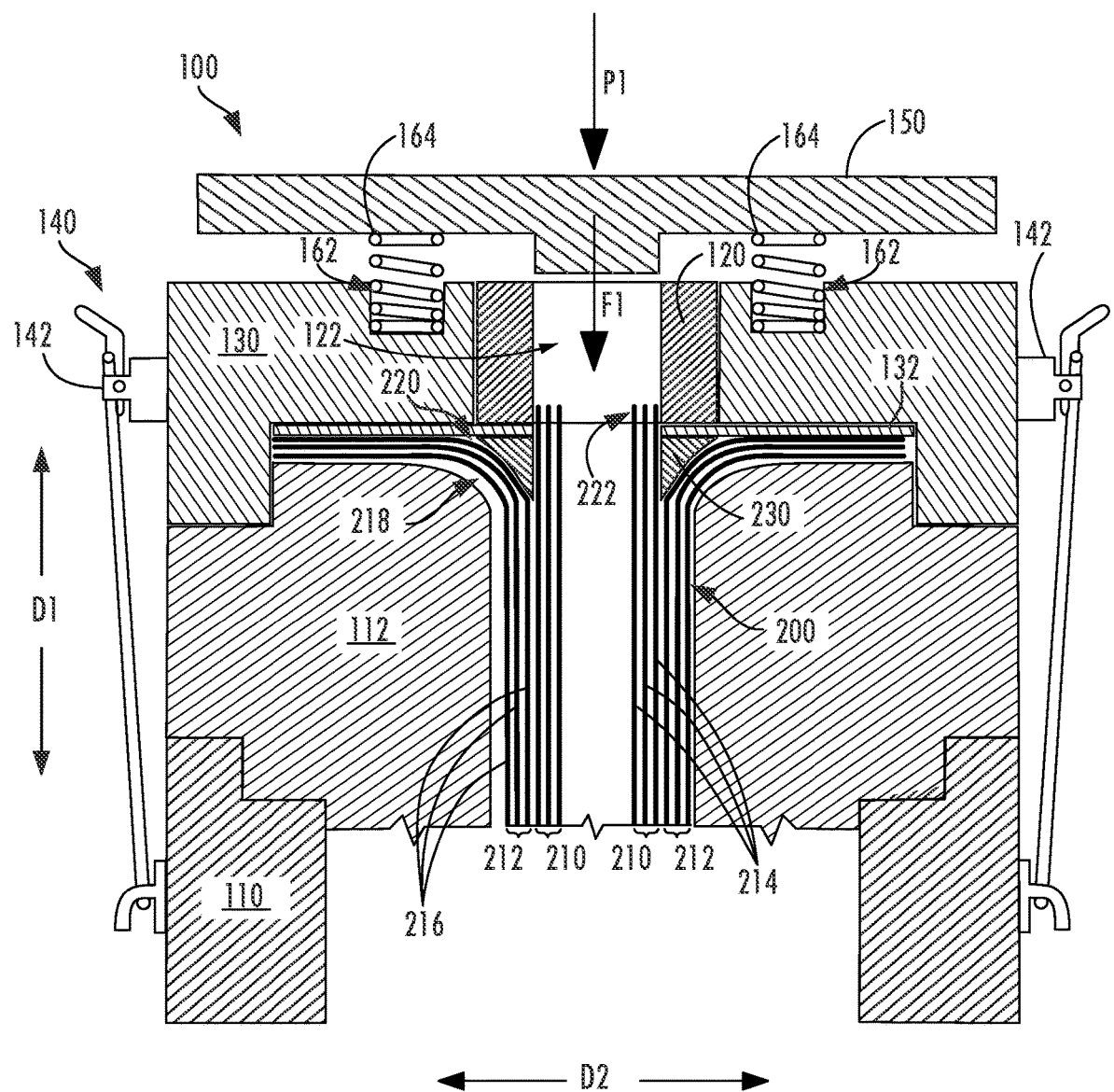
FIG. 6 provides a schematic cross-sectional view of another compaction system in the process of compacting a laminate according to an example embodiment of the present subject matter.

FIG. 6 provides a schematic cross-sectional view of another example compaction system 100 in the process of compacting a laminate 200 according to one example embodiment of the present subject matter. The compaction system 100 of FIG. 6 is configured in a similar manner as the compaction system 100 of FIG. 3 except as provided below. For this embodiment, the band debulk cap 130 defines spring chambers 162 in which springs 164 are positioned. The springs 164 are at least partially received within the spring chambers 162 and extend lengthwise along the first direction D1 to engage the plunger 150.

When a press or other mechanical system applies a force, as represented by the arrow P1 in FIG. 6, the plunger 150 is moved toward the laminate 200 along the first direction D1. When this occurs, the springs 164 are compressed by the plunger 150. The plunger 150 eventually engages the noodle ring 120 and the band debulk cap 130 to compact the noodle 230 into the cavity 220 and the laminate 200 generally. When the force applied by the press or other mechanical system is reduced or no longer applied to the plunger 150, the springs 164 bias the plunger 150 upward or away from the laminate 200 along the first direction D1. Although two springs 164 are shown in FIG. 6, it will be appreciated that the compaction system 100 of FIG. 6 can include more or less than two springs in some embodiments. The press or mechanical system that moves the plunger 150 can be any suitable system, such as a jackscrew or other suitable press machine.

Figure 7:
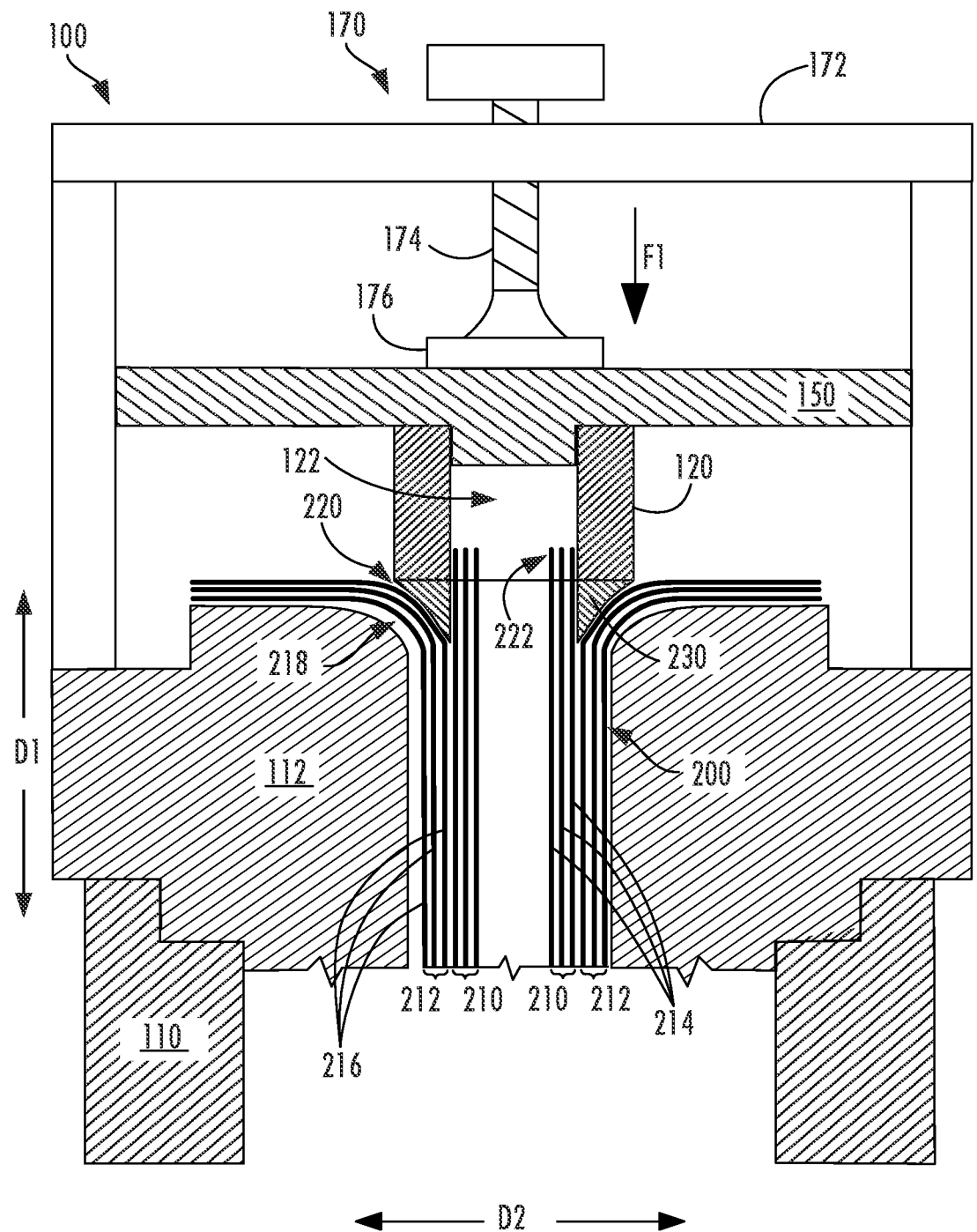
FIG. 7 provides a schematic cross-sectional view of yet another compaction system in the process of compacting a laminate according to an example embodiment of the present subject matter.

FIG. 7 provides a schematic cross-sectional view of yet another example compaction system 100 in the process of compacting a laminate 200 according to an example embodiment of the present subject matter. The compaction system 100 of FIG. 7 is configured in a similar manner as the compaction system 100 of FIG. 3 except as provided below.

For this embodiment, the compaction system 100 includes a press system 170. The press system 170 includes a bridge 172 removably coupled with or fixed to the tool 112. The bridge 172 can be fixed to other structures as well. The press system 170 also includes a leadscrew 174 that is threadingly engaged with a cross bar of the bridge 172 as shown in FIG. 7. The leadscrew 174 can be rotated so that a press 176 of the leadscrew 174 engages the plunger 150. In this way, the plunger 150 can be moved toward the laminate 200 along the first direction D1. The plunger 150 can engage the noodle ring 120 and apply a force F1 thereto. The force F1 applied to the noodle ring 120 by the plunger 150 causes the noodle ring 120 to drive or compact the noodle 230 into the cavity 220 defined by the laminate 200. The leadscrew 174 can be driven or torqued manually by an operator or in automated manner by a torque system, such as an electric motor. The leadscrew 174 can be rotated in the opposite direction to move the press 176 away from the plunger 150 after a compaction cycle or when compaction is complete.

Figure 8:
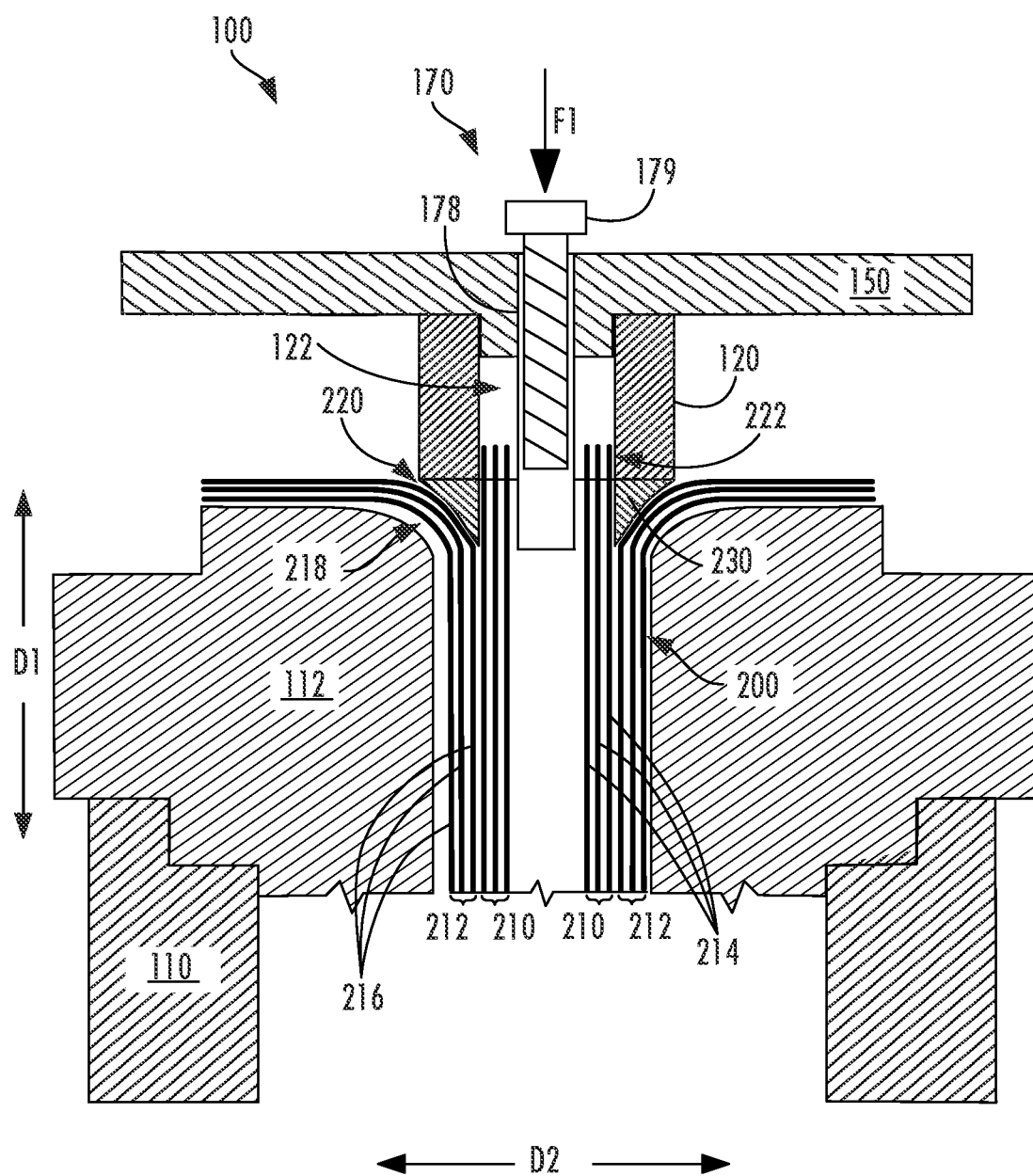
FIG. 8 provides a schematic cross-sectional view of a further compaction system in the process of compacting a laminate according to an example embodiment of the present subject matter.

FIG. 8 provides a schematic cross-sectional view of a further compaction system 100 in the process of compacting a laminate 200 according to an example embodiment of the present subject matter. The compaction system 100 of FIG. 8 is configured in a similar manner as the compaction system 100 of FIG. 3 except as provided below.

For this embodiment, the compaction system 100 includes a press system 170 having a mandrel 178 and a bolt 179 threadingly received within the mandrel 178. As depicted, the mandrel 178 is received within an opening defined by the plunger 150. The bolt 179 can be a cap screw bolt, for example. The bolt 179 can be rotated within the mandrel 178 so that the plunger 150 is moved toward the laminate 200 along the first direction D1. The plunger 150 can engage the noodle ring 120 and apply a force F1 thereto. The force F1 applied to the noodle ring 120 by the plunger 150 causes the noodle ring 120 to drive or compact the noodle 230 into the cavity 220 defined by the laminate 200. The bolt 179 can be driven or torqued manually by an operator or in automated manner by a torque system, such as an electric motor. The bolt 179 can be rotated in the opposite direction to reduce the force F1 that the plunger 150 applies to the noodle ring 120, e.g., after a compaction cycle or when compaction is complete.

Figure 9:
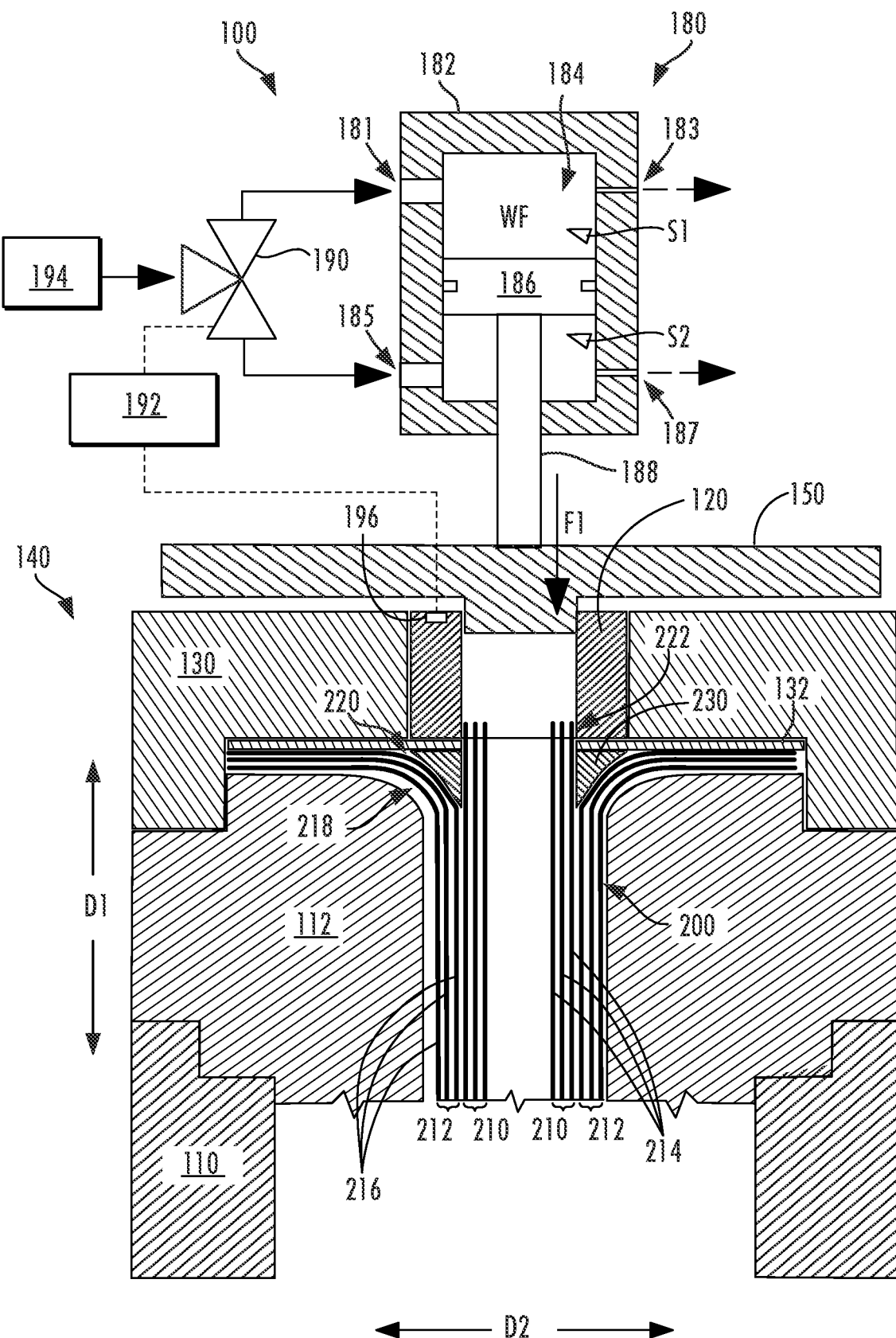
FIG. 9 provides a schematic cross-sectional view of a further compaction system in the process of compacting a laminate according to an example embodiment of the present subject matter.

FIG. 9 provides a schematic cross-sectional view of a further example compaction system 100 in the process of compacting a laminate 200 according to an example embodiment of the present subject matter. The compaction system 100 of FIG. 9 is configured in a similar manner as the compaction system 100 of FIG. 3 except as provided below.

For this embodiment, the compaction system 100 includes a piston system 180 for compacting the laminate 200. As shown, the piston system 180 includes a piston housing 182 defining a piston chamber 184. The piston housing 182 can form a part of a bridge, such as the bridge 172 of FIG. 7. A piston 186 is received within the piston chamber 184 of the piston housing 182 and is movable, e.g., along the first direction D1. A piston rod 188 is coupled with the piston 186. The piston rod 188 extends between a first end and a second end, e.g., along the first direction D1. The first end of the piston rod 188 is coupled with the piston 186. The piston rod 188 is coupled with the plunger 150 at its second end. Accordingly, when the piston 186 is moved within the piston chamber 184, the plunger 150 is likewise moved.

The piston 186 is hydraulically controlled in this example embodiment. It will be appreciated that the piston 186 can be controlled in other suitable manners as well. As depicted, the piston housing 182 defines a first inlet 181 and a first drain 183 that provide an ingress and an egress for working fluid WF to flow into and out of a first side S1 of the piston chamber 184. The piston housing 182 also defines a second inlet 185 and a second drain 187 that provide an ingress and an egress for working fluid WF to flow into and out of a second side S2 of the piston chamber 184. The first and second sides S1, S2 of the piston chamber 184 are fluidly separated by the piston 186. The piston system 180 includes a control valve 190 for controlling the flow of working fluid WF to the piston chamber 184. For this example embodiment, the control valve is a three-way valve.

Figure 12:
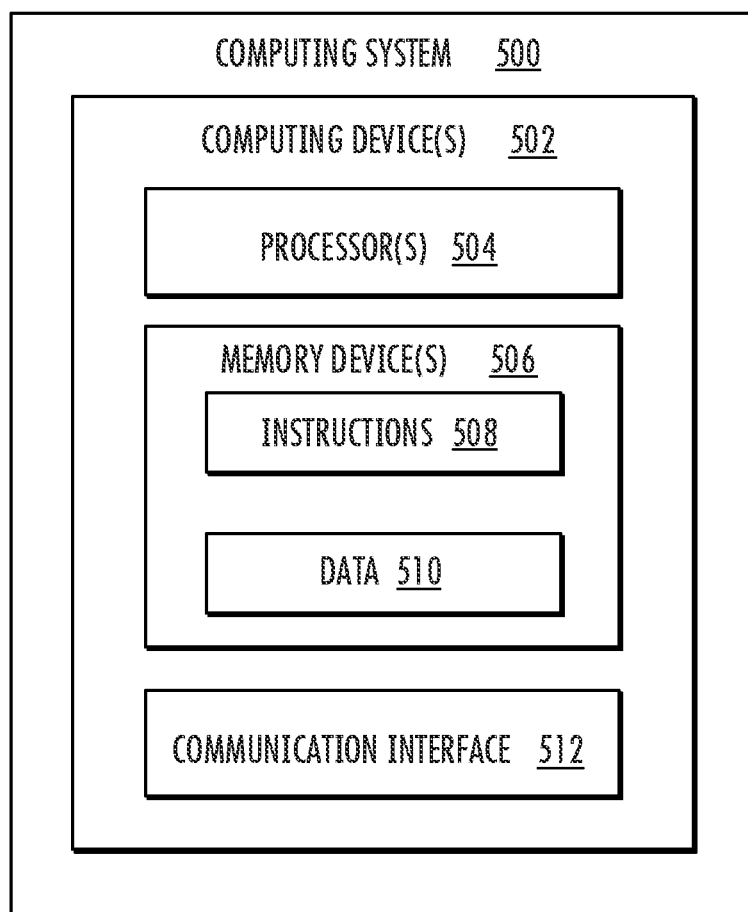
FIG. 12 provides a schematic view of a computing system for implementing one or more aspects of the present disclosure according to example embodiments of the present subject matter.

A controller 192 communicatively coupled with the control valve 190 can control the control valve 190 to selectively allow working fluid WF to flow from a fluid source 194 to the first side S1 of the piston chamber 184 and to prevent working fluid WF from flowing to the second side S2 of the piston chamber 184. The controller 192 can include one or more processors and one or more memory devices. The one or more memory devices can include a non-transitory computer readable storage medium, for example. The one or more memory devices can store information accessible by the one or more processors, including computer-readable instructions that can be executed by the one or more processors. The instructions can be any set of instructions that, when executed by the one or more processors, cause the one or more processors to perform operations, such as controlling the control valve 190. The controller 192 can be configured as shown in FIG. 12 and described in the accompanying text.

By supplying working fluid WF to the first side S1 of the piston chamber 184 and preventing working fluid from flowing to the second side S2, the piston 186 can be moved downward toward the laminate 200 along the first direction D1. The controller 192 can also control the control valve 190 to selectively allow working fluid WF to flow from the fluid source 194 to the second side S2 of the piston chamber 184 and to prevent working fluid WF from flowing to the first side S1 of the piston chamber 184. By supplying working fluid WF to the second side S2 of the piston chamber 184 and preventing working fluid from flowing to the first side S1, the piston 186 can be moved upward away from the laminate 200 along the first direction D1.

A sensor 196 (e.g., a pressure sensor) can be positioned within or attached to the noodle ring 120. The sensor 196 can be communicatively coupled with the controller 192 and can provide feedback signals indicating the applied pressure placed on the noodle ring 120 by the plunger 150. The controller 192 can control the control valve 190, and thus the flow of working fluid WF to the piston chamber 184, based at least in part on the received feedback signals.

Figure 10:
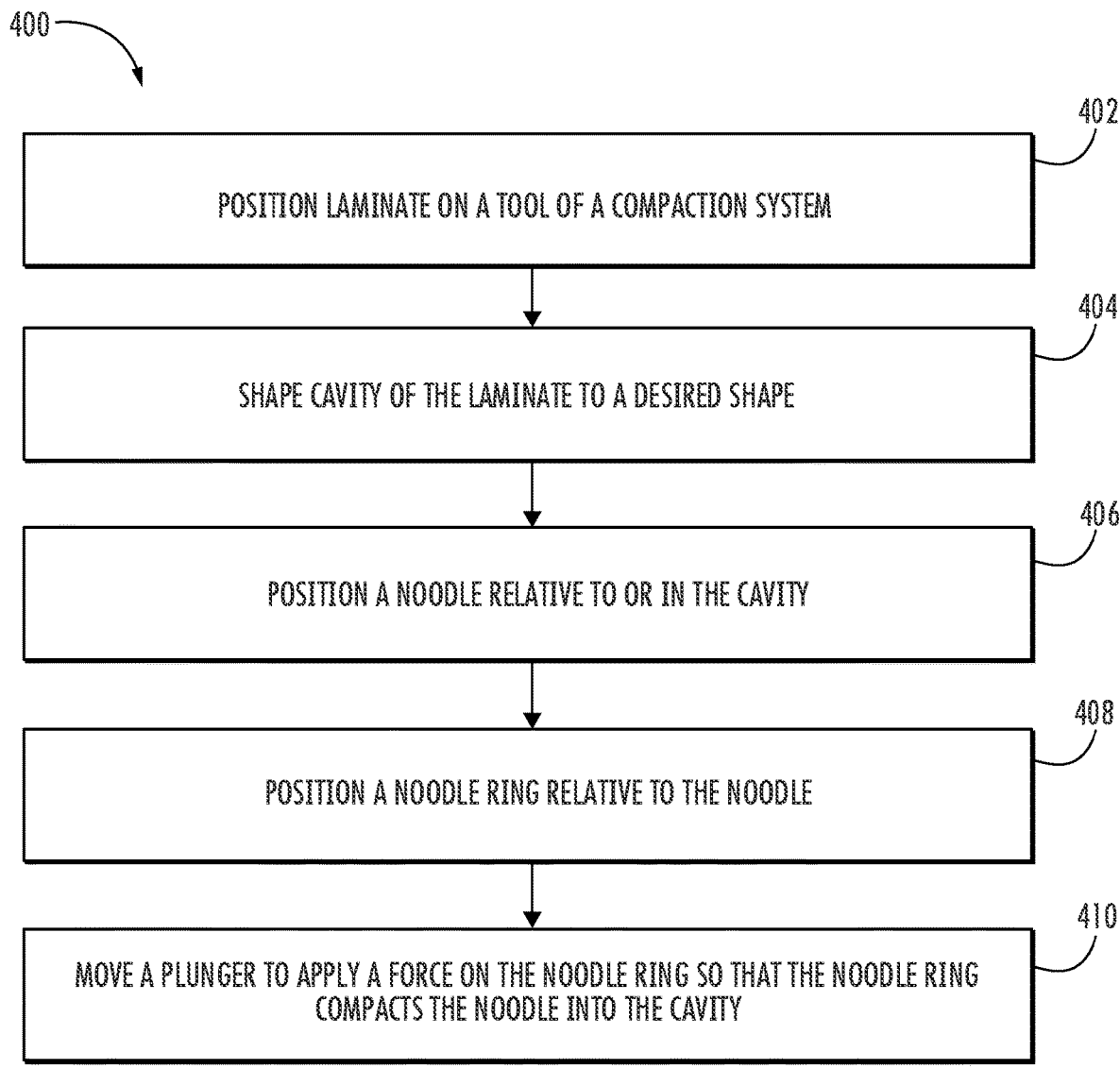
FIG. 10 provides a flow diagram of a method of compacting a laminate according to one example embodiment of the present subject matter.

FIG. 10 provides a flow diagram of a method (400) of compacting a laminate according to an exemplary embodiment of the present subject matter. Any of the example compaction systems provided herein can be used to compact a laminate using method (400). Other compaction systems can be used to compact a laminate using method (400) as well.

At (402), the method (400) includes positioning a laminate on a tool of a compaction system. The laminate positioned on the tool can formed of one or more plies. The laminate can be positioned on the tool by laying up the plies of the laminate directly on the tool or the laminate can be laid up elsewhere and subsequently positioned on the tool. Further, the laminate can define a cavity. In some instances, the laminate is laid up in such a way that the laminate defines a cavity. For instance, FIG. 3 depicts an example laminate 200 positioned on the tool 112 of the compaction system 100. As illustrated, the laminate 200 defines cavity 220. The cavity 220 is defined between the first section 210 and the second section 212 of the laminate 200 at the joint interface 218.

At (404), the method (400) optionally includes shaping the cavity of the laminate to a desired shape. For instance, shaping the cavity of the laminate to the desired shape can include pressing a shaping tool into the cavity of the laminate to shape the cavity. The shaping tool can be mounted to the plunger of the compaction system, for example.

Figure 11:
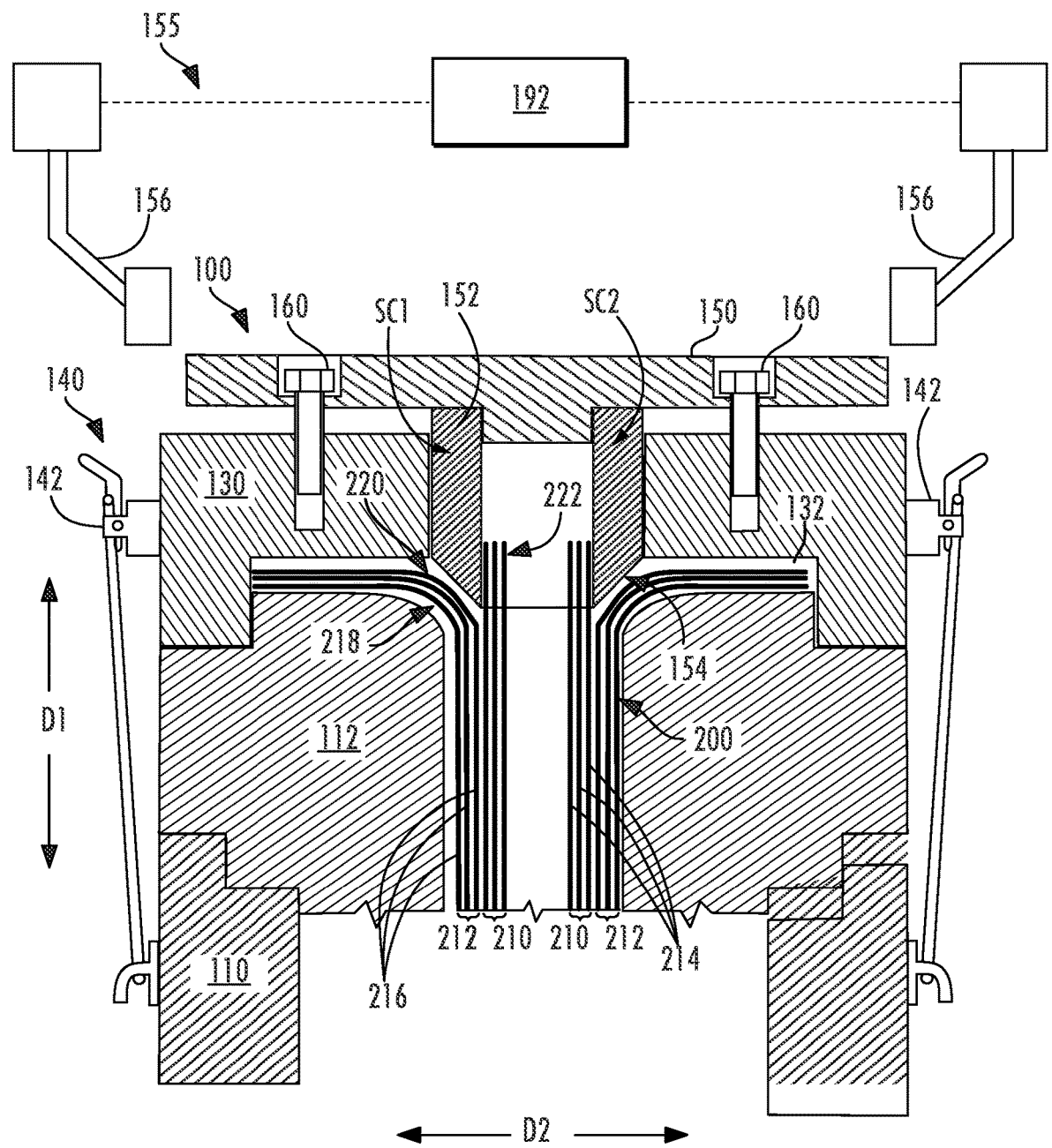
FIG. 11 provides a schematic cross-sectional view of a compaction system in the process of shaping a cavity of a laminate to a desired shape according to one example embodiment of the present subject matter.

By way of example, FIG. 11 provides a schematic cross-sectional view of a compaction system 100 in the process of shaping a cavity 220 of a laminate 200 to a desired shape. As depicted, a shaping tool 152 is mounted to the plunger 150. For instance, the plunger 150 can include a chuck that holds the shaping tool 152. The shaping tool 152 includes a shaping end 154 that is shaped complementary to the desired shape of the cavity 220. To achieve the desired geometry of the cavity 220, the plunger 150 with the shaping tool 152 mounted thereto can be moved toward the laminate 200 along the first direction D1. The plunger 150 can be moved along the first direction D1 in any suitable manner, e.g., by tightening bolts 160 as shown in FIG. 11. The plunger 150 can move the shaping end 154 of the shaping tool 152 into the cavity 220. In this way, the shaping end 154 of the shaping tool 152 can shape the cavity 220 by pressing on the laminate 200. For instance, in FIG. 11, the shaping end 154 can press on the first section 210 and the second section 212 to form the cavity 220 to the desired geometry so that a noodle can be positioned therein.

In some implementations, optionally, the method (400) can include inserting a slurry into the cavity prior to the noodle being compacted into the cavity. The slurry can be composed of a matrix material, such as a ceramic matrix material. The inserted slurry composition may facilitate a more complete filling of the cavity, which may lead to improved mechanical properties of the finished component.

At (406), the method (400) includes positioning a noodle relative to or in the cavity. The noodle is positioned relative to or in the cavity so that the noodle is received within the cavity during the compaction process. In some implementations, the noodle is positioned such that at least a portion of the noodle is positioned within the cavity. For instance, as shown in FIG. 3, noodle 230 is shown positioned in the cavity 220 of the laminate 200. The noodle can be formed of any suitable material, such as a CMC material. The noodle can be positioned manually by an operator or automatically, e.g., by a piston-controlled noodle insertion tool. For instance, a noodle insertion tool can be mounted to the plunger 150 of the compaction system 100 of FIG. 9. For instance, a chuck of the plunger 150 can hold the noodle insertion tool. The noodle can be mounted to the noodle insertion tool. The plunger 150 can be controlled to move toward the laminate 200 along the first direction D1 by the controller 192. The noodle insertion tool can position the noodle 230 relative to the cavity 220.

At (408), the method (400) includes positioning a noodle ring relative to the noodle. For instance, in some implementations, the noodle ring can be positioned directly on the noodle. In other implementations, a sheet or film can be placed between the noodle ring and the noodle. For example, protective sheet 132 is shown positioned between the noodle ring 120 and the noodle 230, e.g., along the first direction D1. In some implementations, the noodle ring is formed as a single component. In other implementations, the noodle ring is formed of at least two sections.

In some implementations, with the noodle ring 120 positioned in place, optionally, a band debulk cap can be secured in place by a latch system to retain the noodle ring 120 in place during compaction, e.g., as shown in FIG. 3. In other implementations, the noodle ring 120 can include a main body and one or more stabilizing members extending outward from the main body, e.g., as shown in FIG. 5. The stabilizing members can be mounted to the tool upon which the laminate is positioned, for example. In some implementations, the main body includes at least one pair of stabilizing members that extend in opposite directions from the main body. The main body can have an outline or cross section shaped complementary to the noodle. The noodle ring can be coupled with the tool via one or more fasteners extending through openings in the stabilizing members and corresponding openings in the tool, e.g., as shown in FIG. 5.

The noodle ring can be positioned manually by an operator. In some implementations, the noodle ring defines a hollow interior, includes a look-through window, and/or is transparent in whole or in part. Such features may allow an operator to see the laminate while positioning the noodle ring relative to the noodle. This can prevent damage to the laminate. Furthermore, in some implementations, the noodle ring can be positioned automatically, e.g., by a piston-controlled plunger with a noodle ring positioning tool mounted thereto. The noodle ring can be mounted to the noodle ring positioning tool and can be released by the tool when the noodle ring is positioned relative to the noodle.

In some further implementations, as noted, the noodle ring can be formed in sections. In such implementations, the sections of the noodle ring can be moved into place or positioned relative to the noodle by an automated system at a non-vertical angle, e.g., at a forty-five degree angle relative to the first direction D1. For instance, an automated system 155 is shown in FIG. 11. The automated system 155 can include one or more robotic arms 156 or other suitable devices. In this example embodiment, the robotic arms 156 can move a first section SC1 and a second section SC2 of the noodle ring 120 in place. The first and second sections SC1, SC2 can form respective halves of the noodle ring 120. The robotic arms 156 can be controlled by a controller 192, for example. The controller 192 can be configured as shown in FIG. 12 and described in the accompanying text. Positioning the sections SC1, SC2 of the noodle ring 120 at a non-vertical angle relative to the first direction D1 can prevent the noodle ring from crushing or otherwise damaging the protruding portion 222 of the laminate 200. In some implementations, the sections SC1, SC2 of the noodle ring 120 are positioned or moved toward the laminate 200 by at least a fifteen degree offset relative to the first direction D1 and at least a fifteen degree offset relative to the second direction D2.

At (410), the method (400) includes moving a plunger to apply a force on the noodle ring so that the noodle ring compacts the noodle into the cavity. For instance, a plunger of the compaction system can be moved toward the laminate. The plunger can be moved by any suitable system, mechanism, or device. For instance, in some implementations, the plunger 150 can be moved by tightening one or more bolts 160 as shown in FIG. 3. In some implementations, the plunger 150 can be moved by a press system 170 as shown in FIG. 7. In some implementations, the plunger 150 can be moved by a piston system 180 as shown in FIG. 9. In some implementations, the plunger 150 can be moved by other suitable mechanical systems, e.g., as represented in FIG. 6. For instance, the plunger 150 can be a plate movable by a jackscrew or an arbor press.

As shown in FIG. 3, the plunger 150 can be moved toward the laminate 200 along the first direction D1 and can engage the noodle ring 120. With the noodle ring 120 engaged, the plunger 150 applies a force F1 on the noodle ring 120. The noodle ring 120 in turn applies a force on the protective sheet 132, which in turn applies a force on the noodle 230. The force on the noodle 230 compacts the noodle 230 into the cavity 220. In view of these applied forces, the noodle 230 can be satisfactorily compacted into the cavity 220. The plunger 150 can also engage the band debulk cap 130, which in turn can apply a force on the protective sheet 132, which in turn can apply a force on the portion of the second section 212 that extends lengthwise along the second direction D2.

After compacting the laminate 200 and the noodle 230 into the cavity 220 of the laminate 200, the plunger 150 can be moved away from the laminate 200 along the first direction D1. The laminate can be removed from the tool 112 and the compaction process can be repeated with subsequent laminates.

FIG. 12 provides a block diagram of an example computing system 500 that can be used to implement methods and systems described herein according to example embodiments of the present subject. The computing system 500 is one example of a suitable computing system for implementing the computing elements described herein.

As shown in FIG. 12, the computing system 500 can include one more computing device(s) 502. The controllers described herein can be embodied as one of the computing device(s) 502. The one or more computing device(s) 502 can include one or more processor(s) 504 and one or more memory device(s) 506. The one or more processor(s) 504 can include any suitable processing device, such as a microprocessor, microcontroller, integrated circuit, logic device, or other suitable processing device. The one or more memory device(s) 506 can include one or more computer-readable medium, including, but not limited to, non-transitory computer-readable medium or media, RAM, ROM, hard drives, flash drives, and other memory devices, such as one or more buffer devices.

The one or more memory device(s) 506 can store information accessible by the one or more processor(s) 504, including computer-readable instructions 508 that can be executed by the one or more processor(s) 504. The instructions 508 can be any set of instructions that, when executed by the one or more processor(s) 504, cause the one or more processor(s) 504 to perform operations. The instructions 508 can be software written in any suitable programming language or can be implemented in hardware. The instructions 508 can be any of the computer-readable instructions noted herein.

The memory device(s) 506 can further store data 510 that can be accessed by the processor(s) 504. For example, the data 510 can include one or more table(s), function(s), algorithm(s), model(s), equation(s), etc. according to example embodiments of the present disclosure.

The one or more computing device(s) 502 can also include a communication interface 512 used to communicate, for example, with other components of the compaction system 100 or other systems or devices. The communication interface 512 can include any suitable components for interfacing with one or more network(s), including for example, transmitters, receivers, ports, controllers, antennas, or other suitable components.

Although the figures and the accompanying text disclose exemplary systems and methods for compacting composite components, such as CMC and PMC components, the systems and methods disclosed herein are applicable to compacting other types of components as well.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

Further aspects of the invention are provided by the subject matter of the following clauses:

1. A method, comprising: positioning a laminate formed of plies on a tool of a compaction system, the laminate defining a cavity; positioning a noodle relative to or in the cavity; positioning a noodle ring relative to the noodle; and moving a plunger to apply a force on the noodle ring so that the noodle ring compacts the noodle into the cavity.

2. The method of any preceding clause, further comprising: pressing a shaping tool mounted to the plunger into the cavity of the laminate to shape the cavity.

3. The method of any preceding clause, wherein the laminate has a first section and a second section, wherein the first section extends lengthwise along a first direction and at least a portion of the second section extends lengthwise along the first direction and at least a portion of the second section extends lengthwise along a second direction that is substantially orthogonal to the first direction, and wherein the cavity is defined between the first section and the second section where the second section transitions from extending lengthwise along the first direction to extending lengthwise along the second direction.

4. The method of any preceding clause, wherein the noodle ring defines a hollow interior.

5. The method of any preceding clause, wherein the noodle ring has a look-through window.

6. The method of any preceding clause, wherein the noodle ring is at least in part transparent.

7. The method of any preceding clause, further comprising: positioning a protective sheet between the noodle and the noodle ring.

8. The method of any preceding clause, wherein the noodle ring has a cross section shaped complementary to a cross section of the noodle.

9. The method of any preceding clause, further comprising: inserting a slurry into the cavity prior to the noodle being compacted into the cavity.

10. The method of any preceding clause, wherein the noodle ring has a main body and a first stabilizing member extending outward from the main body and coupling the noodle ring to at least one of a band debulk cap and the tool, the main body having a cross section shaped complementary to a cross section of the noodle.

11. The method of any preceding clause, wherein the noodle ring has a second stabilizing member extending outward from the main body and coupling the noodle ring to at least one of the band debulk cap and the tool.

12. The method of any preceding clause, wherein the first stabilizing member and the second stabilizing member extend outward from the main body in opposite directions.

13. The method of any preceding clause, wherein the noodle ring is formed of at least two sections.

14. The method of any preceding clause, wherein the at least two sections of the noodle ring are positioned by an automated system relative to the noodle at a non-vertical angle.

15. The method of any preceding clause, wherein the plunger is moved by a press system, the press system having a bridge coupled with the tool and a leadscrew threadingly engaged with the bridge, the leadscrew having a press that engages the plunger.

16. The method of any preceding clause, wherein the plunger is moved by a piston system, the piston system having a piston housing defining a piston chamber and a piston movable within the piston chamber, the piston being coupled with the plunger via a piston rod, and wherein when the piston is moved within the piston chamber, the plunger is moved in unison with the piston.

17. A method, comprising: positioning a laminate on a tool of a compaction system, the laminate having a first section and a second section each formed of one or more plies, the laminate defining a cavity at a location where the first section and the second section diverge; positioning at least a portion of a noodle in the cavity; positioning a noodle ring relative to the noodle, the noodle ring having a cross section shaped complementary to a cross section of the noodle; and moving a plunger to apply a force on the noodle ring so that the noodle ring compacts the noodle into the cavity.

18. The method of any preceding clause, wherein a protruding portion of the first section of the laminate overlaps with the noodle ring along a first direction.

19. The method of any preceding clause, further comprising: positioning a band debulk cap relative to the tool and the noodle ring, the band debulk cap defining a spring chamber in which a spring is received, the spring being connected to the band debulk cap and engaged with the plunger for biasing the plunger away from the laminate.

20. A method, comprising: positioning a laminate on a tool of a compaction system, the laminate defining a cavity; positioning at least a portion of a noodle in the cavity; positioning a noodle ring relative to the noodle; coupling the noodle ring to the tool; and applying a force on the noodle ring so that the noodle is compacted into the cavity.

What is claimed is:

1. A method, comprising:
   positioning a laminate formed of plies on a tool of a compaction system, the laminate defining a cavity;
   positioning a noodle relative to or in the cavity;
   positioning a noodle ring relative to the noodle; and
   moving a plunger to apply a force on the noodle ring so that the noodle ring compacts the noodle into the cavity.

2. The method of claim 1, further comprising:
   pressing a shaping tool mounted to the plunger into the cavity of the laminate to shape the cavity.

3. The method of claim 1, wherein the laminate has a first section and a second section, wherein the first section extends lengthwise along a first direction and at least a portion of the second section extends lengthwise along the first direction and at least a portion of the second section extends lengthwise along a second direction that is substantially orthogonal to the first direction, and wherein the cavity is defined between the first section and the second section where the second section transitions from extending lengthwise along the first direction to extending lengthwise along the second direction.

4. The method of claim 1, wherein the noodle ring defines a hollow interior.

5. The method of claim 1, wherein the noodle ring has a look-through window.

6. The method of claim 1, wherein the noodle ring is at least in part transparent.

7. The method of claim 1, further comprising:
   positioning a protective sheet between the noodle and the noodle ring.

8. The method of claim 1, wherein the noodle ring has a cross section shaped complementary to a cross section of the noodle.

9. The method of claim 1, further comprising:
   inserting a slurry into the cavity prior to the noodle being compacted into the cavity.

10. The method of claim 1, wherein the noodle ring has a main body and a first stabilizing member extending outward from the main body and coupling the noodle ring to at least one of a band debulk cap or the tool, the main body having a cross section shaped complementary to a cross section of the noodle.

11. The method of claim 10, wherein the noodle ring has a second stabilizing member extending outward from the main body and coupling the noodle ring to at least one of the band debulk cap or the tool.

12. The method of claim 11, wherein the first stabilizing member and the second stabilizing member extend outward from the main body in opposite directions.

13. The method of claim 1, wherein the noodle ring is formed of at least two sections.

14. The method of claim 13, wherein the at least two sections of the noodle ring are positioned by an automated system relative to the noodle at a non-vertical angle.

15. The method of claim 1, wherein the plunger is moved by a press system, the press system having a bridge coupled with the tool and a leadscrew threadingly engaged with the bridge, the leadscrew having a press that engages the plunger.

16. The method of claim 1, wherein the plunger is moved by a piston system, the piston system having a piston housing defining a piston chamber and a piston movable within the piston chamber, the piston being coupled with the plunger via a piston rod, and wherein when the piston is moved within the piston chamber, the plunger is moved in unison with the piston.

17. A method, comprising:
    positioning a laminate on a tool of a compaction system, the laminate having a first section and a second section each formed of one or more plies, the laminate defining a cavity at a location where the first section and the second section diverge;
    positioning at least a portion of a noodle in the cavity;
    positioning a noodle ring relative to the noodle, the noodle ring having a cross section shaped complementary to a cross section of the noodle; and
    moving a plunger to apply a force on the noodle ring so that the noodle ring compacts the noodle into the cavity.

18. The method of claim 17, wherein a protruding portion of the first section of the laminate overlaps with the noodle ring along a first direction.

19. The method of claim 17, further comprising:
    positioning a band debulk cap relative to the tool and the noodle ring, the band debulk cap defining a spring chamber in which a spring is received, the spring being connected to the band debulk cap and engaged with the plunger for biasing the plunger away from the laminate.

20. A method, comprising:
    positioning a laminate on a tool of a compaction system, the laminate defining a cavity;
    positioning at least a portion of a noodle in the cavity;
    positioning a noodle ring relative to the noodle;
    coupling the noodle ring to the tool; and
    applying a force on the noodle ring so that the noodle is compacted into the cavity.

* * * * *